United States Patent
MacKenzie et al.

(10) Patent No.: US 6,520,264 B1
(45) Date of Patent: Feb. 18, 2003

(54) ARRANGEMENT AND METHOD FOR DEPLOYING DOWNHOLE TOOLS

(75) Inventors: Gordon R J MacKenzie, Cypress, TX (US); Mark E. Plante, Houston, TX (US); Dwayne L. Whitney, Cochrane (CA)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/713,557

(22) Filed: Nov. 15, 2000

(51) Int. Cl.$^7$ .............................................. E21B 19/22
(52) U.S. Cl. .................... 166/385; 166/65.1; 166/242.2
(58) Field of Search .......................... 166/254.2, 65.1, 166/66, 66.6, 181, 241.5, 242.2, 385, 386

(56) References Cited

U.S. PATENT DOCUMENTS

| | | | | |
|---|---|---|---|---|
| 4,431,963 A | | 2/1984 | Walkow | .................... 324/65 R |
| 4,619,323 A | * | 10/1986 | Gidley | ........................ 166/285 |
| 4,808,925 A | | 2/1989 | Baird | |
| 5,285,008 A | * | 2/1994 | Sas-Jaworsky et al. | ....... 174/47 |
| 5,769,160 A | * | 6/1998 | Owens | ........................ 166/65.1 |
| 6,138,756 A | * | 10/2000 | Dale | ........................ 166/254.2 |
| 6,296,066 B1 | * | 10/2001 | Terry et al. | .................... 175/92 |

FOREIGN PATENT DOCUMENTS

| | | |
|---|---|---|
| EP | 0681353 | 5/1995 |
| GB | 1389671 | 9/1971 |
| GB | 1449264 | 11/1973 |
| GB | 1546377 | 5/1975 |
| GB | 2190457 | 11/1987 |
| GB | 2 272 926 | 6/1994 |

\* cited by examiner

*Primary Examiner*—David Bagnell
*Assistant Examiner*—Zakiya Walker
(74) *Attorney, Agent, or Firm*—Cantor Colburn LLP

(57) ABSTRACT

A pump-through electrical conductor line includes an electrically conductive wire, an insulative coating disposed over the electrically conductive wire, and a tubing having the electrically conductive wire with the insulative coating disposed thereover loosely positioned therein so as to form a non-obstructed annulus between the insulative coating and an inner surface of the tubing. An arrangement for downhole casing collar location includes a length of the pump-through electrical conductor line, a slickline running unit configured to deliver the pump-through electrical conductor line to a downhole environment, a plugging device disposed on a downhole end of the pump-through electrical conductor line, and a casing collar locator disposed on the pump-through electrical conductor line adjacent the plugging device. The location of a casing collar involves running the casing collar locator on the pump-through electrical conductor line into the downhole environment and communicating with the casing collar locator through the electrically conductive wire of the pump-through electrical conductor line.

6 Claims, 8 Drawing Sheets

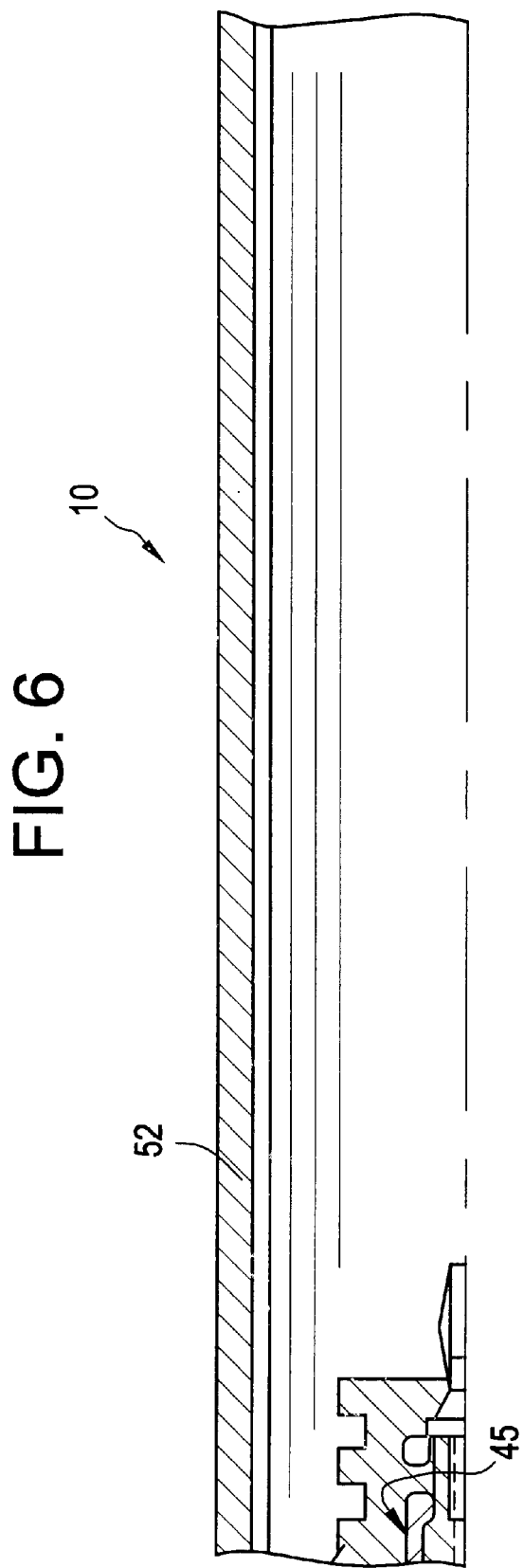

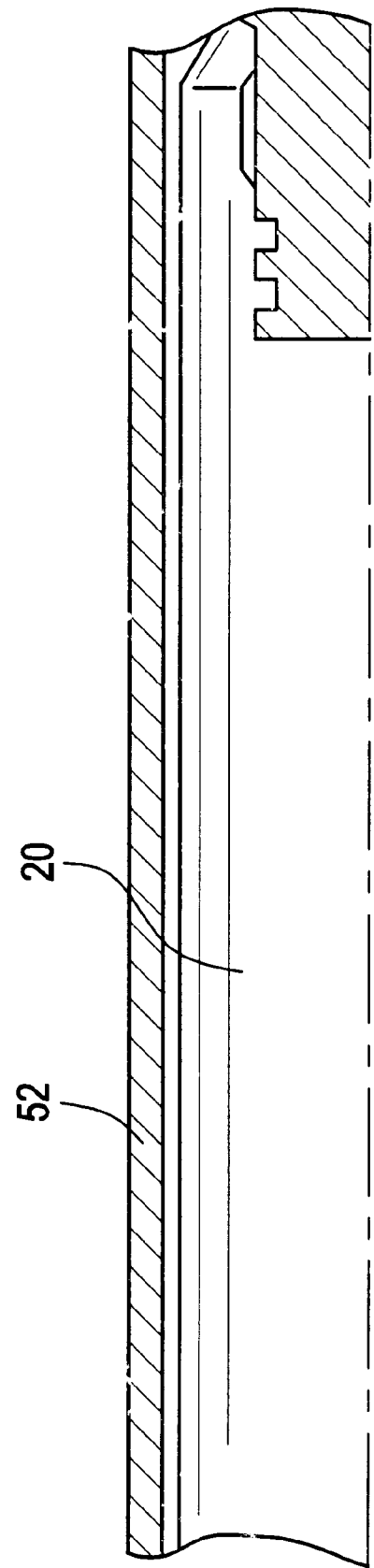

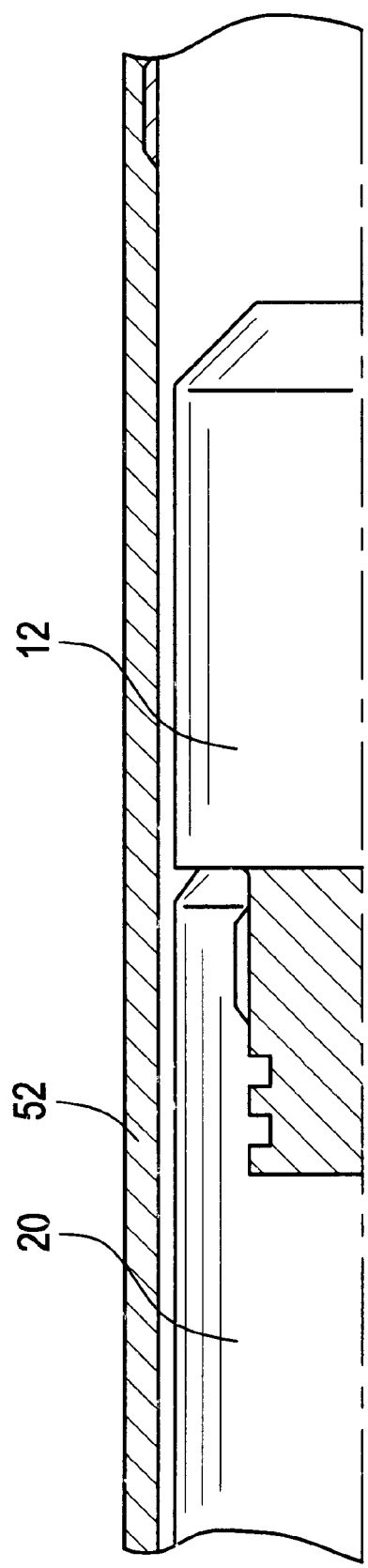

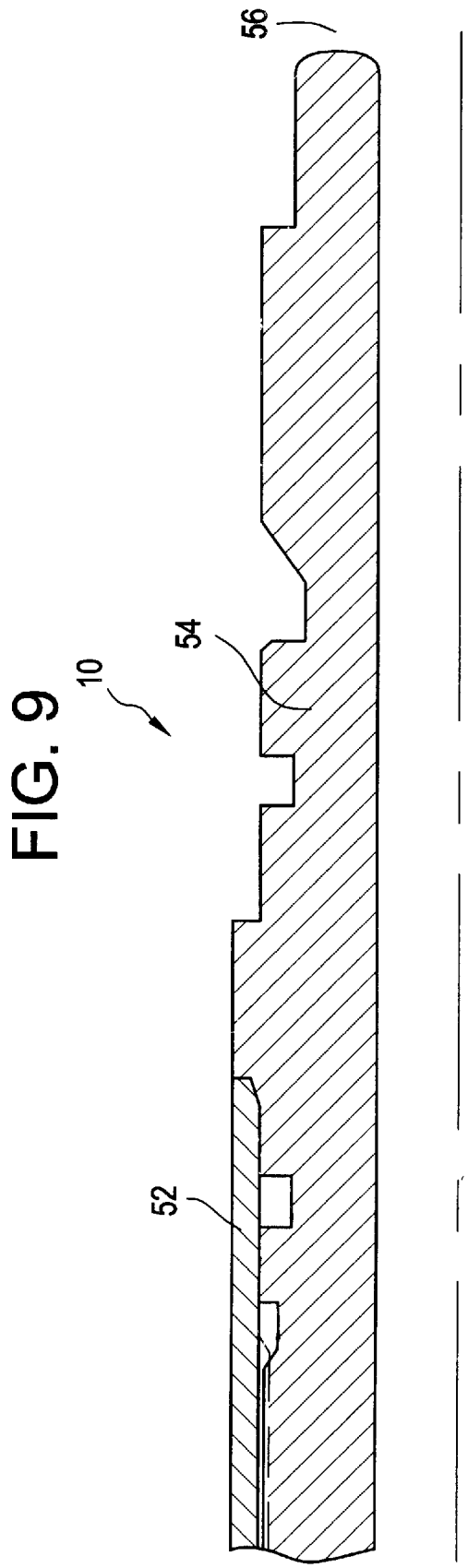

ARRANGEMENT AND METHOD FOR DEPLOYING DOWNHOLE TOOLS

BACKGROUND

1. Field of the Invention

This disclosure relates to downhole oil field operations, and, more particularly, to the arrangement and method for deployment of and communication with downhole tools after completion of a wellbore.

2. Prior Art

Running tools downhole in a completed wellbore has been and likely will continue to be a necessary part of hydrocarbon exploration, drilling and production for the foreseeable future. The frequency of running of such tools may not only maintain its present level but may increase in level. Current devices and methods for running such tools into the downhole environment generally tend to be costly and/or suffer from other disadvantages such as a lack of communication with the surface. These two exemplary drawbacks of the prior art are correlated respectively with other running methods, i.e., those incorporating wireline and slickline. Wireline is very expensive to run, although it does provide for communications. Slickline, while not providing communication to the surface or power for tools downhole and therefore precluding casing collar locator use, is relatively inexpensive to run. Since any operation to be carried out in the oil field or any other field of endeavor necessarily requires a cost benefit analysis, both wireline and slickline leave much to be desired.

SUMMARY

The arrangement and method disclosed herein are directed to alleviating the drawbacks inherent in the prior art methods for accomplishing the same goals. To practice the method, an insulated conductor disposed within tubing is run from a slickline running unit. The conductor/tubing assembly is configured to sustain the free flow of fluid through an annulus formed by the insulated conductor disposed within the tubing and defines a pump-through deployment system. A downhole end of the pump-through deployment system is operably attached to an adjustable downhole tool through a casing collar locator positioned adjacent an uphole end of the adjustable downhole tool. Additional downhole tools may further be connected to the casing collar locator or tool for effectuating other downhole operations. The downhole tools may be, for example, pump-through real-time telemetry systems, pump-through gamma ray tools, or other devices.

The method of locating a casing collar includes running a casing collar locator on the pump-through deployment system or otherwise conventional slickline equipment into a downhole environment and communicating with the casing collar locator through the insulated conductor disposed in the tubing. The method may include telemetering information from the downhole environment to a surface environment through the insulated conductor.

The method and arrangement are beneficial to the art since the arrangement provides both communication and power while facilitating rapid deployment and real time communications with the surface environment while avoiding the significant expense of a wireline unit.

IN THE DRAWINGS

Referring now to the drawings wherein like elements are numbered alike in the several Figures:

FIG. 6 is a quarter sectional view of a housing of the pump-through deployment system;

FIG. 7 is a quarter sectional view of a casing collar locator of the pump-through deployment system;

FIG. 8 is a quarter sectional view of a bull plug connected to the downhole end of the casing collar locator of the pump-through deployment system; and FIG. 9 is a quarter sectional view of a bottom sub of the pump-through deployment system.

DETAILED DESCRIPTION

Figure 1:
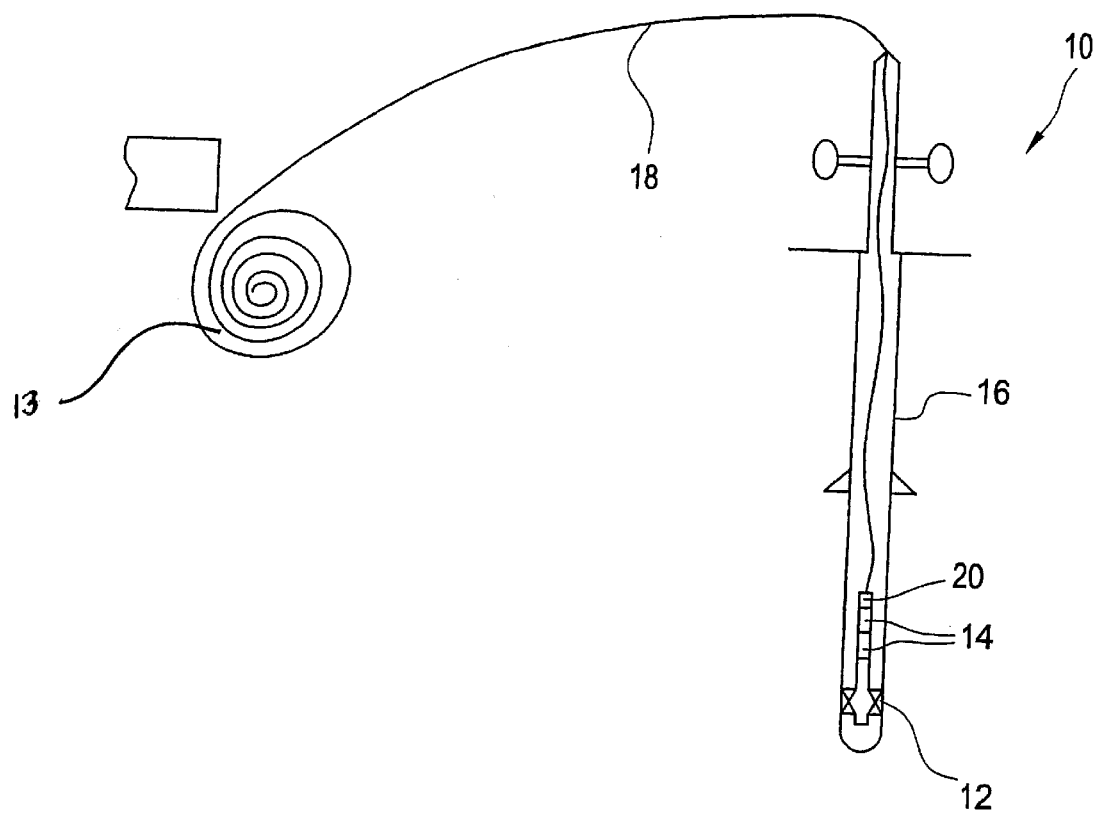
FIG. 1 is a schematic illustration of a oil well with a slickline running unit schematically illustrated.

Referring to FIG. 1, a pump through deployment system is shown generally at 10 and is hereinafter referred to as "system 10". System 10 provides a means for running permanent or retrievable adjustable downhole tools and other various instruments into a wellbore shown generally at 16, while allowing for the control of plugging devices. System 10 comprises a pump-through deployment system, a top sub, a crossover sub, a contact block, a housing, a casing collar locator 20 a bottom sub, and an adjustable downhole tool 12. Optionally, other tools 14 can be included in system 10. Tools 14, as shown in FIG. 1, may include a gamma ray tool, a real time telemetry system, or other similar devices, or any combination thereof. In a preferred embodiment, a slickline running unit 13 is incorporated into system 10 and is used to run an electrical conductor line 18 into wellbore 16. The subs, the contact block, and the housing are all illustrated below with reference to FIGS. 3 through 9.

Figure 2:
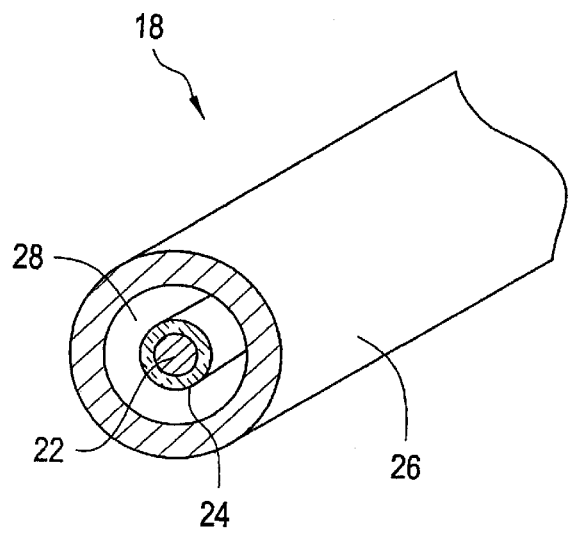
FIG. 2 is a perspective view of a section of a conductor/tubing assembly employed in the invention.

Referring now to FIG. 2, electrical conductor line 18 is shown generally and in greater detail. Electrical conductor line 18, comprises an electrically conductive wire 22 encased in an insulative coating 24 such that the pump-through deployment system is formed. Conductive wire 22 having insulative coating 24 disposed thereon is run through a length of tubing 26 and is dimensioned so as to define an annulus 28 between an outer surface of insulative coating 24 and an inner surface of tubing 26. Conductive wire 22 is configured at a downhole end thereof to be attached to the adjustable downhole tools and other tools in the wellbore. Likewise, an uphole end of conductive wire 22 is electronically configured to enable an operator (not shown) to control and manipulate the tools in the wellbore. Conductive wire 22 encased in insulative coating 24 is furthermore not anchored within tubing 26, thereby defining annulus 28 so as not to include any obstructions. The absence of obstructions in annulus 28 allows for the free flow of fluids (not shown) therethrough. This facilitates the pumping of fluid through the line, which has heretofore not been possible.

Figure 3:
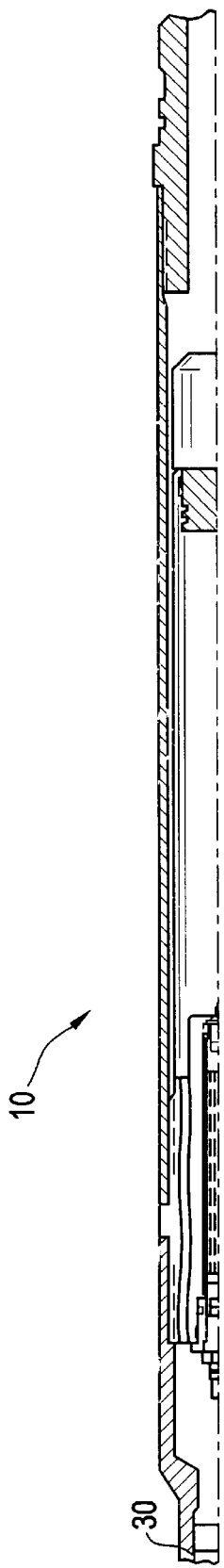
FIG. 3 is a quarter sectional view of a pump-through deployment system.
Figure 4:
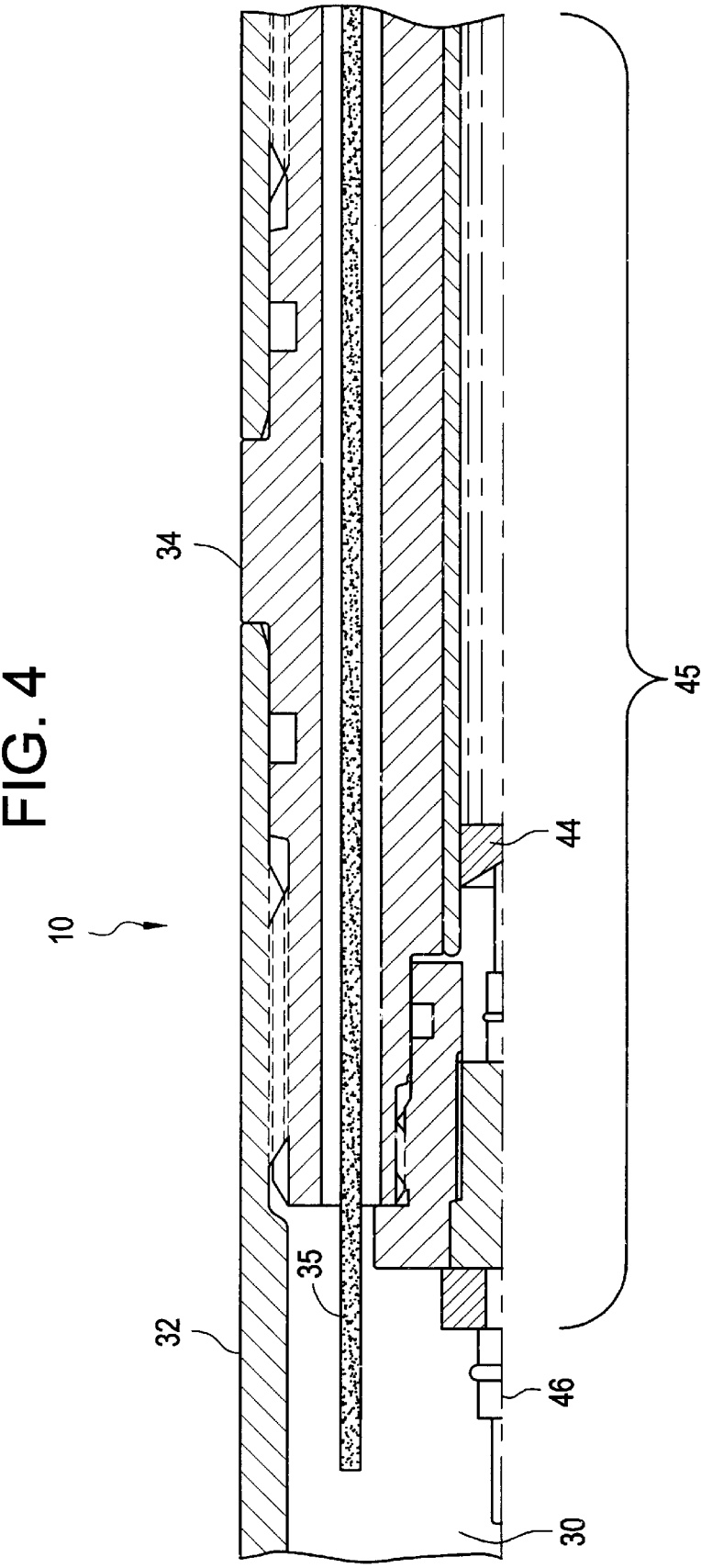
FIG. 4 is a quarter sectional view of a top sub of the pump-through deployment system.

Referring now to FIGS. 3 through 9, system 10 is illustrated in quarter sectional view. FIG. 3 shows an overall length of system 10 without the pump-through electrical conductor line attached to an uphole end 30. In FIG. 4, a top sub 32 is positioned at uphole end 30 of system 10 and includes an access hole (not shown) positioned in an upper end thereof to allow the pump-through electrical conductor line to be received by the various tools that can be associated with system 10. Top sub 32 is a tubular sleeve for receiving the crossover sub (described below). Threads (shown below with reference to FIG. 5) are positioned on an inner surface of a lower end of top sub 32 for receiving the crossover sub.

Figure 5:
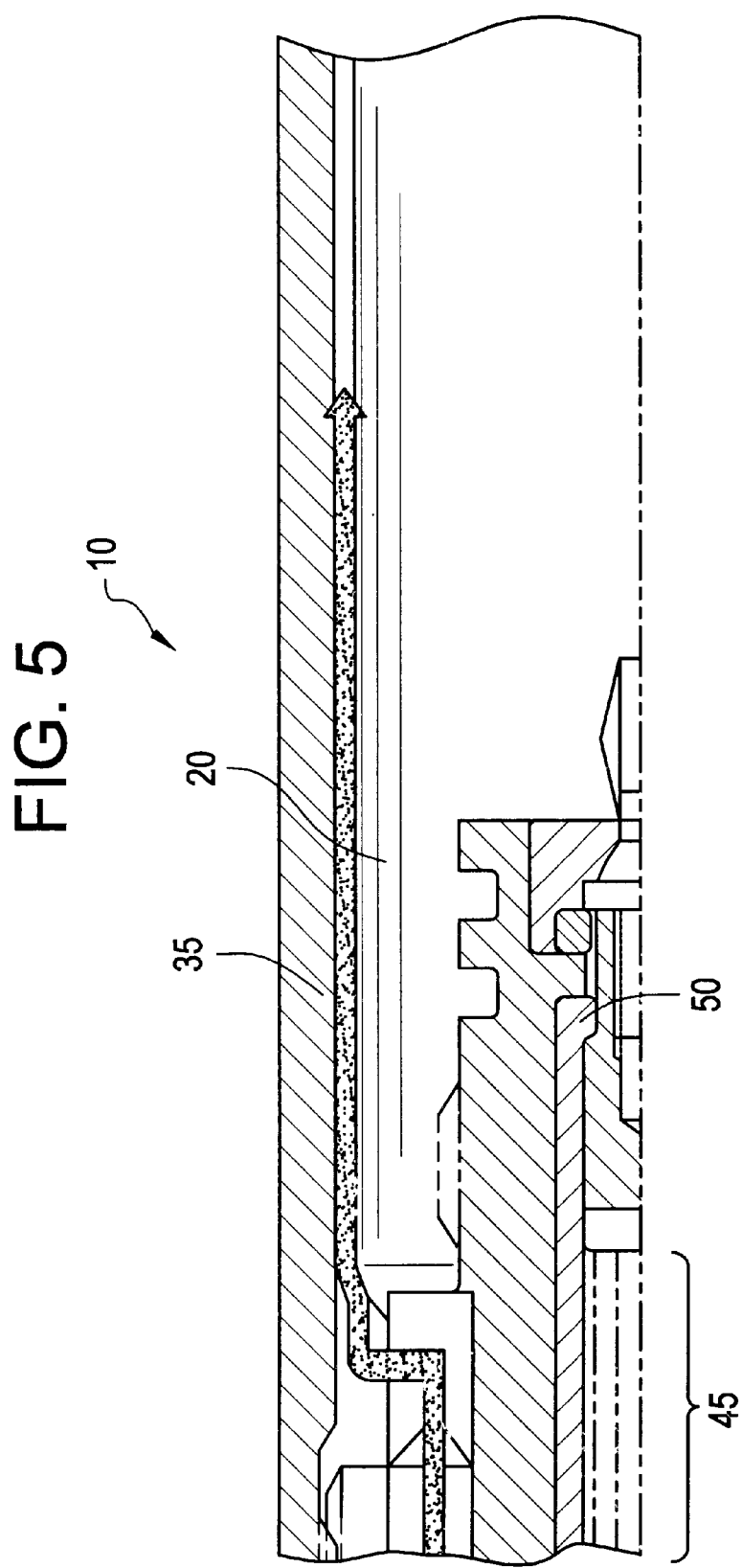
FIG. 5 is a quarter sectional view of a contact block and a cross flow sub of the pump-through deployment system.

Referring to FIGS. 4 and 5, crossover sub, shown generally at 34, includes a box thread 36 proximate an upper end as well as a box thread 40 proximate a lower end. Crossover sub 34 forms an intermediate tubular sleeve that contains at least one channel. The path of the channel from uphole end 30 through system 10 is illustrated by an arrow 35. The path of the channel shown by arrow 35 allows for the flow of fluid through system 10. Fluids flowing from downhole sections of system 10 can flow through crossover sub 34 to top sub 32, where they can enter the annulus of the pump-through electrical conductor line and be drawn to the surface. Alternatively, hydraulic fluids can be introduced into the pump-through electrical conductor line at the surface and pumped downhole through top sub 32 and crossover sub 34 to hydraulically operated tools.

Positioned inside of crossover sub 34 is a contact assembly, shown generally at 45. Contact assembly 45 is configured to maintain electrical communication through system 10 by electrically connecting the tools and plugging devices downhole to the pump-through electrical conductor line. A connector 46 extends from the upper end of contact assembly 45 to receive the pump-through electrical conductor line. In a preferred embodiment, connector 46 is configured to provide a simple and efficient connection to the pump-through electrical conductor line with a minimum amount of tools and hardware. An insulating sleeve 48 extends lengthwise along an interior of contact assembly 45. A contact block 44 is positioned within contact assembly 45 to provide electrical communication between the downhole tools and the surface environment. The lower end of contact assembly 45 includes a quick connect/disconnect mechanism 50 actuated by a contact spring (not shown), which provides a means for connecting casing collar locator 20 to system 10.

Referring to FIG. 6, housing 52 is a tubular sleeve that fits over the crossover sub and contact assembly 45 extending therefrom to form an intermediate section of system 10. An inner surface of an uphole end of housing 52 is threaded to enable housing 52 to be received by a box thread on the lower end of the crossover sub. An inner surface of a downhole end of housing 52 is also threaded (shown with reference to FIG. 9) to enable housing 52 to be threadedly connected to the bottom sub.

Referring to FIGS. 7 and 8, housing 52 is dimensioned to receive casing collar locator 20 and adjustable downhole tool 12 therein. Casing collar locator 20 is used to assist in positioning the tools and other devices in the wellbore. Electric currents passed through the pump-through electrical conductor line and from casing collar locator 20 through housing 52 to a casing wall (not shown) are measured. In a typical application, the electric current is responsive to variations in the casing wall caused by the positioning of casing collars (not shown), which are detected as changes in the electrical resistance at different locations along the casing wall. These variations are detected by electronic equipment (not shown) and interpreted by an operator at the surface.

Casing collar locator 20 is preferably in operable communication with adjustable downhole tool 12, which can be disengaged from casing collar locator 20 and left to remain in the wellbore. Adjustable downhole tool 12 may be of the mechanical type, the inflatable type, or a composite of both types, and preferably includes hydraulic or mechanical disconnect mechanisms that can be easily remotely actuated from the surface. In an alternate embodiment, as shown in FIG. 1, various other tools may be positioned between casing collar locator 20 and adjustable downhole tool 12.

In FIG. 9, threads 54 are shown on the downhole end of housing 52. Bottom sub 54 is threadedly received on threads 54. The downhole end of bottom sub 54 forms a terminus 56 of system 10.

System 10 provides rapid delivery of the casing collar locator as well as other equipment to a desired position while providing pump-through capability. Such an arrangement, and particularly the pump-through electrical conductor line configuration at the surface of the wellbore, utilizes conventional slickline running units which are conventional in the art, are inexpensive, and allow for the rapid deployment of the pumpthrough system described above.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An arrangement for downhole casing collar location, comprising:
   a length of pump-through electrical conductor line comprising:
      a tubing having a conductor disposed loosely inside said tubing to form a non-obstructed annulus between the conductor and an inside surface of the tubing;
   a slickline running unit configured to deliver said pump-through electrical conductor line to a downhole environment;
   a plugging device disposed on a downhole end of said pump-through electrical conductor line; and
   a casing collar locator disposed on said pump-through electrical conductor line and adjacent to said plugging device.

2. The arrangement of claim 1 wherein said arrangement further includes at least one downhole tool disposed on said downhole end of said pump-through electrical conductor line.

3. The arrangement of claim 2 wherein said downhole tool is a pump-through real-time telemetry system.

4. The arrangement of claim 2 wherein said downhole tool is a pump-through gamma ray tool.

5. A method of locating a casing collar, comprising:
   running a casing collar locator on pump-through electrical conductor line into a downhole environment, said electrical conductor line having a tubing and a conductor disposed loosely inside said tubing to form a non-obstructed annulus between said conductor and an inner surface of said tubing; and
communicating with said casing collar locator through a conductor of said pump-through electrical conductor line.

6. The method of locating a casing collar of claim 5 wherein said communicating with said casing collar locator comprises telemetering information from said downhole environment to a surface environment through said conductor.

* * * * *